US012072003B2

(12) United States Patent
Kato et al.

(10) Patent No.: US 12,072,003 B2
(45) Date of Patent: Aug. 27, 2024

(54) CONTROLLER AND OPERATION SYSTEM

(71) Applicant: Alps Alpine Co., Ltd., Tokyo (JP)

(72) Inventors: Hidekazu Kato, Miyagi-ken (JP); Tatsuaki Kawase, Miyagi-ken (JP)

(73) Assignee: Alps Alpine Co., Ltd. (JP)

(*) Notice: Subject to any disclaimer, the term of this patent is extended or adjusted under 35 U.S.C. 154(b) by 446 days.

(21) Appl. No.: 17/643,599

(22) Filed: Dec. 10, 2021

(65) Prior Publication Data
US 2022/0099166 A1  Mar. 31, 2022

Related U.S. Application Data

(63) Continuation of application No. PCT/JP2020/010565, filed on Mar. 11, 2020.

(30) Foreign Application Priority Data

Jun. 14, 2019  (JP) ................... 2019-111531

(51) Int. Cl.
*F16H 19/04* (2006.01)
*A63F 13/24* (2014.01)
(Continued)

(52) U.S. Cl.
CPC ............. *F16H 19/04* (2013.01); *G05G 1/015* (2013.01); *G05G 1/02* (2013.01); *G05G 5/05* (2013.01);
(Continued)

(58) Field of Classification Search
CPC ... A63F 13/24; H01H 2003/008; F16H 19/04; G05G 1/015; G05G 1/02; G05G 5/05; G05G 5/06
See application file for complete search history.

(56) References Cited

U.S. PATENT DOCUMENTS 5,829,745 A * 11/1998 Houle .................... A63F 13/24
463/47
6,104,382 A * 8/2000 Martin .................... A63F 13/24
345/161

(Continued)

FOREIGN PATENT DOCUMENTS

| JP | H10-261346 A | 9/1998 |
| JP | 2000-293298 A | 10/2000 |
| JP | 2016-067667 A | 5/2016 |

OTHER PUBLICATIONS

International Search Report for corresponding International Application No. PCT/JP2020/010565 dated Apr. 21, 2020 with English translation (10 Pages).

*Primary Examiner* — David L Lewis
*Assistant Examiner* — Robert E Mosser
(74) *Attorney, Agent, or Firm* — Harness, Dickey & Pierce, P.L.C.

(57) ABSTRACT

A controller controls an operating device. The operating device includes an operating member capable of being pushed by an operator, a biasing unit biasing the operating member in a return direction, a detecting unit configured to detect a distance of movement of the operating member and output a detection signal indicating the distance of movement, and a braking unit configured to brake movement of the operating member. In response to determining, based on the detection signal, that the operating member is pushed into a predetermined retracted position, the controller causes the braking unit to hold the operating member pushed. In response to determining, based on the detection signal, that the operating member is moved in the return direction because of a clearance in a drive transmission system between the operating member and the braking unit, the controller causes the braking unit to stop holding the operating member.

8 Claims, 12 Drawing Sheets

(51) Int. Cl.
*G05G 1/015* (2008.04)
*G05G 1/02* (2006.01)
*G05G 5/05* (2006.01)
*G05G 5/06* (2006.01)
*H01H 13/20* (2006.01)

(52) U.S. Cl.
CPC ............... *G05G 5/06* (2013.01); *A63F 13/24* (2014.09); *A63F 2300/1043* (2013.01); *F16H 2019/046* (2013.01); *H01H 13/20* (2013.01)

(56) References Cited

U.S. PATENT DOCUMENTS

| | | | |
|---|---|---|---|
| 9,122,309 B2 * | 9/2015 | Hanlon | ................... G01L 5/223 |
| 10,613,629 B2 * | 4/2020 | Laurendeau | ........ G06F 3/04845 |

* cited by examiner

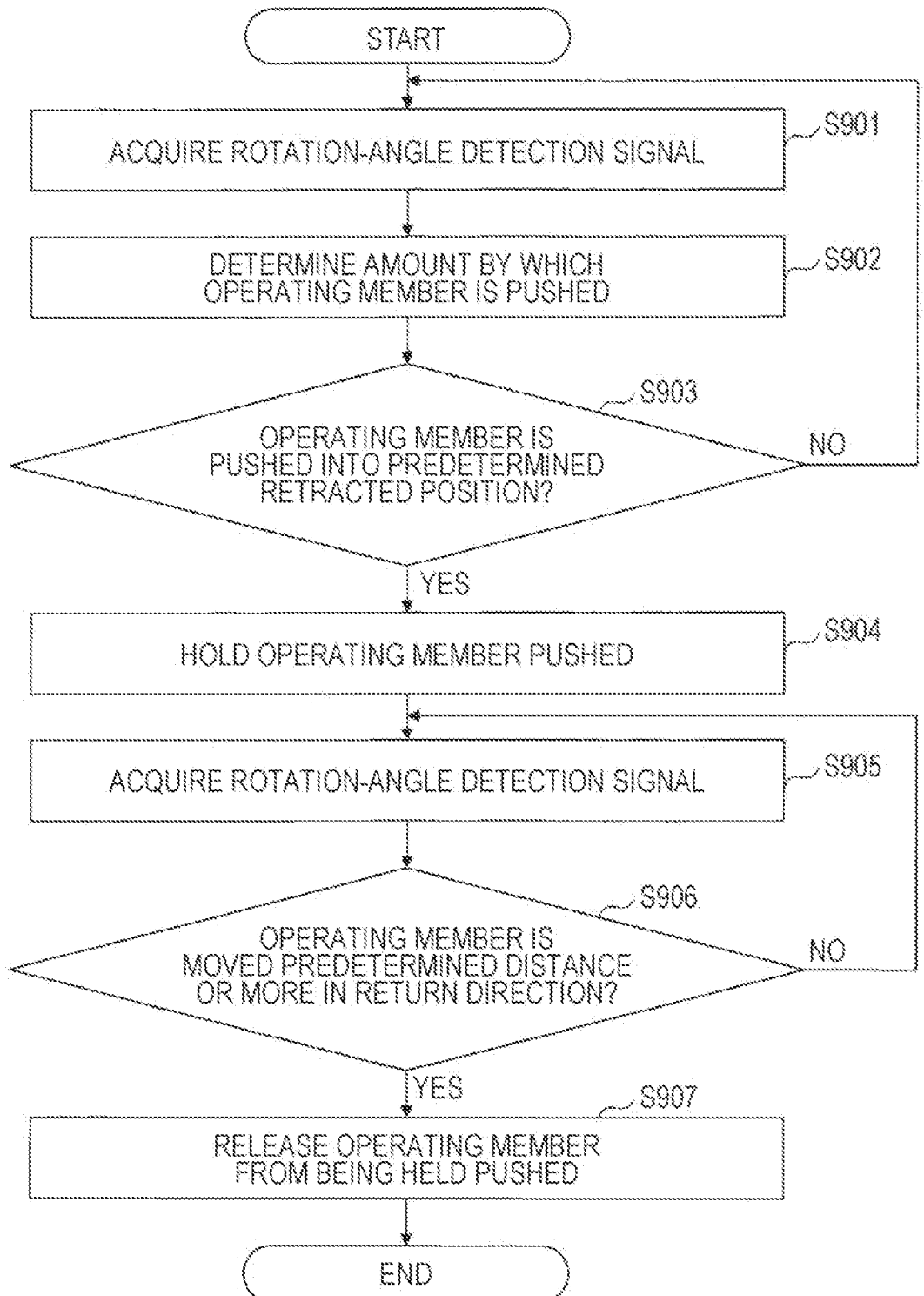

FIG. 10A
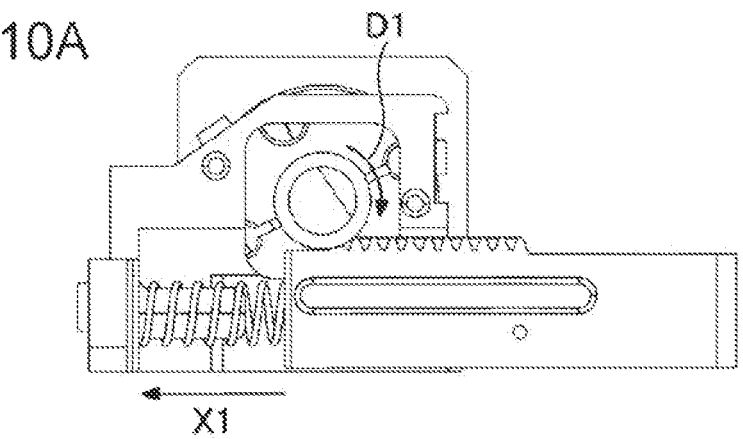
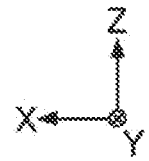
FIG. 10B
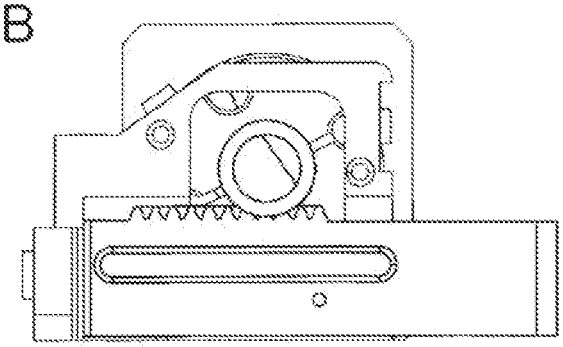
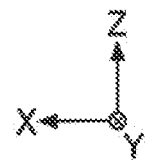
FIG. 10C
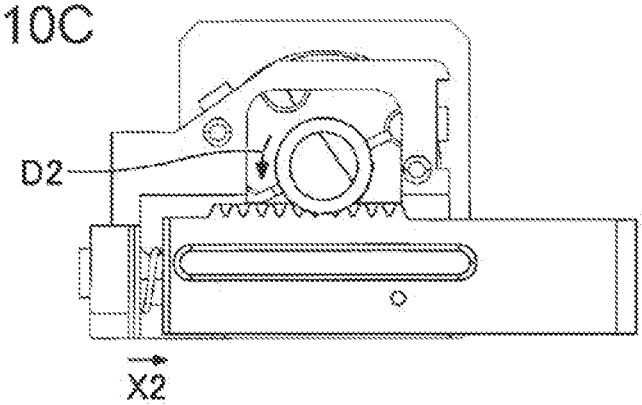
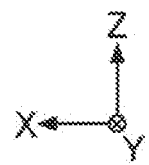
FIG. 10D
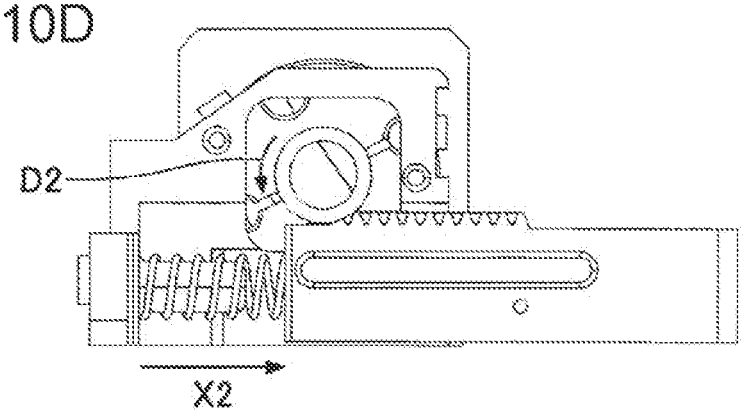
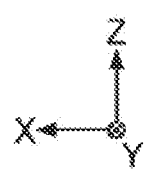

CONTROLLER AND OPERATION SYSTEM

CLAIM OF PRIORITY

This application is a Continuation of International Application No. PCT/JP2020/010565 filed on Mar. 11, 2020, which claims benefit of Japanese Patent Application No. 2019-111531 filed on Jun. 14, 2019. The entire contents of each application noted above are hereby incorporated by reference.

BACKGROUND OF THE INVENTION

1. Field of the Invention

The present invention relates to a controller and an operation system.

2. Description of the Related Art

A known operating device used as, for example, a controller for a game machine, includes an operating member capable of being pushed by an operator and a biasing unit (e.g., a coil spring) that biases the operating member to return the operating member to its initial position when the operating member is released from being pushed.

For such an operating device, for example, Japanese Unexamined Patent Application Publication No. 2016-067667 discloses a game controller including an operating member capable of being pushed and a motor configured to apply a force to the operating member. As disclosed in Japanese Unexamined Patent Application Publication No. 2016-067667, controlling the motor can restrict a distance that the operating member moves.

Such a related-art operating device can be configured such that the operating member is held pushed by a braking unit. To return the operating member to its initial position when an operator stops a pushing operation, the operating device needs to further include a contact sensor (e.g., an electrostatic sensor) to detect a stoppage of the pushing operation.

SUMMARY OF THE INVENTION

An embodiment of the present invention provides a controller that controls an operating device. The operating device includes an operating member capable of being pushed by an operator, a biasing unit biasing the operating member in a return direction, a detecting unit configured to detect a distance of movement of the operating member and output a detection signal indicating the distance of movement, and a braking unit configured to brake movement of the operating member. In response to determining, based on the detection signal, that the operating member is pushed into a predetermined retracted position, the controller causes the braking unit to hold the operating member pushed. In response to determining, based on the detection signal, that the operating member is moved in the return direction because of a clearance in a drive transmission system between the operating member and the braking unit, the controller causes the braking unit to stop holding the operating member.

According to the embodiment, a stoppage of a pushing operation of the operator can be detected without any optional contact sensor, and the operating member can be released from being held by the braking unit.

BRIEF DESCRIPTION OF THE DRAWINGS

FIG. 9 is a flowchart illustrating a process by a controller in accordance with one embodiment;

FIGS. 10A to 10D are diagrams explaining an operation of the operating device in accordance with one embodiment;

DESCRIPTION OF THE PREFERRED EMBODIMENTS

Embodiments will be described below with reference to the drawings.

Configuration of Operating Device 100

Figure 1:
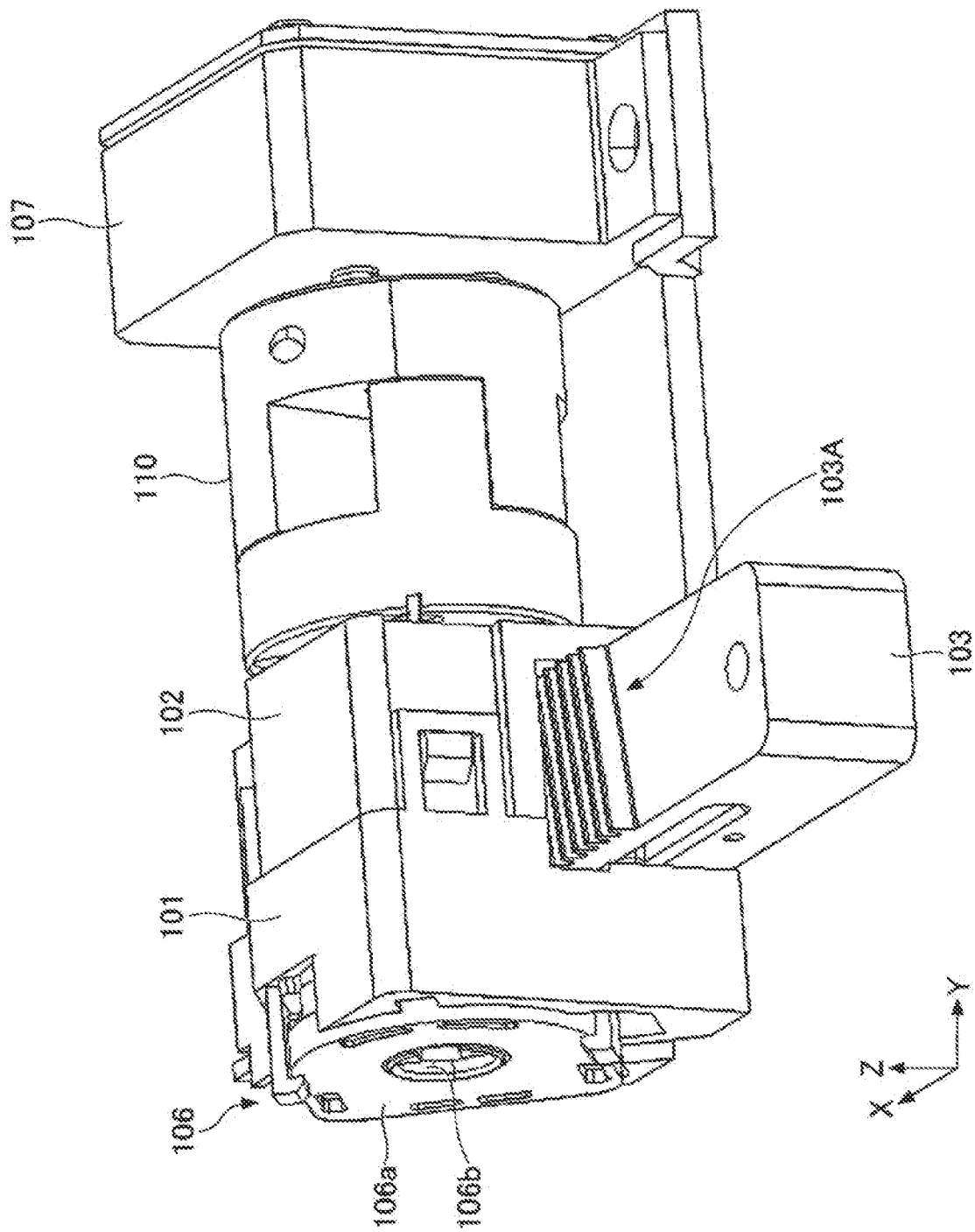
FIG. 1 is a perspective view of an operating device in accordance with one embodiment.
Figure 2:
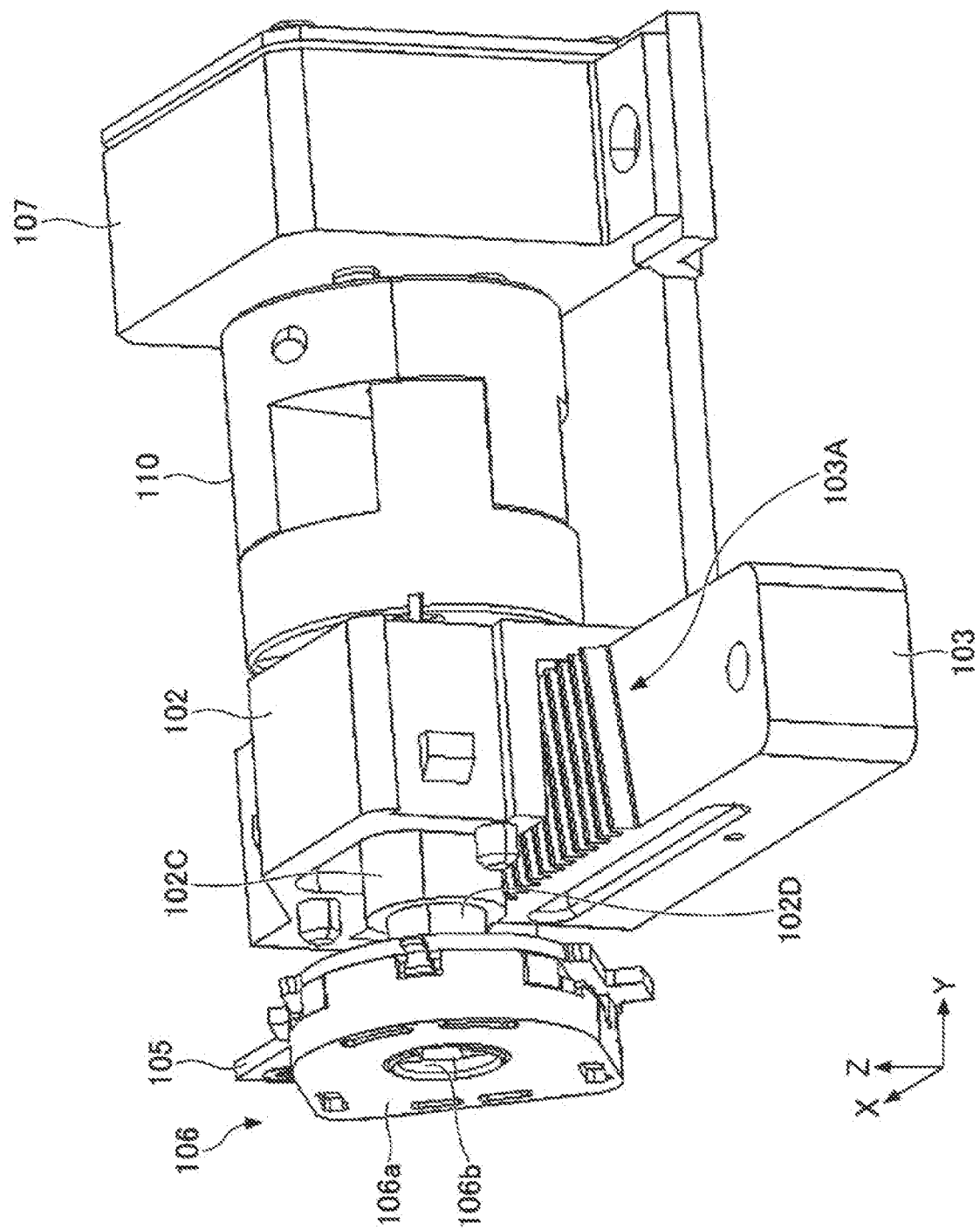
FIG. 2 is a perspective view of the operating device.
Figure 3:
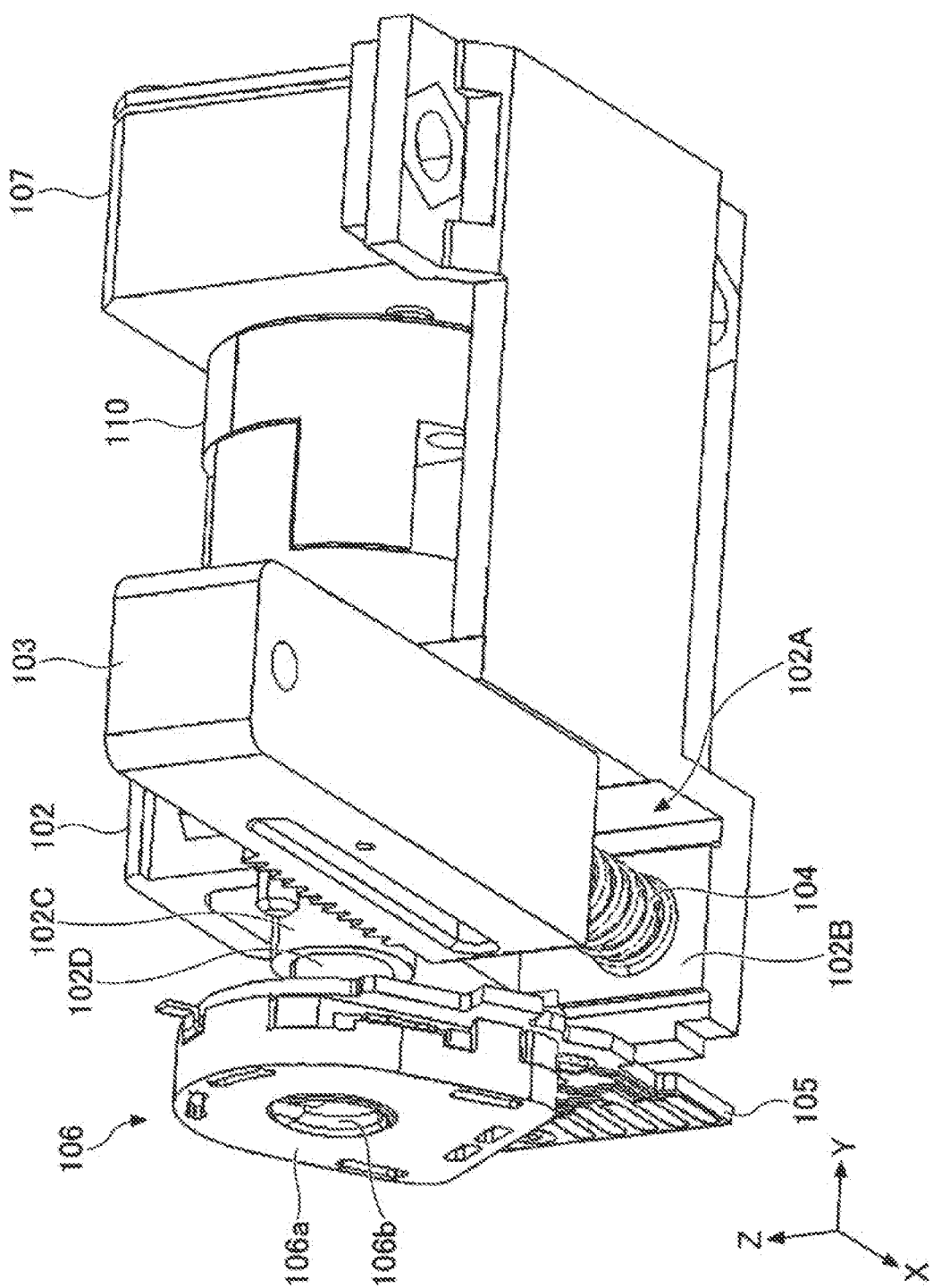
FIG. 3 is a perspective view of the operating device.
Figure 4:
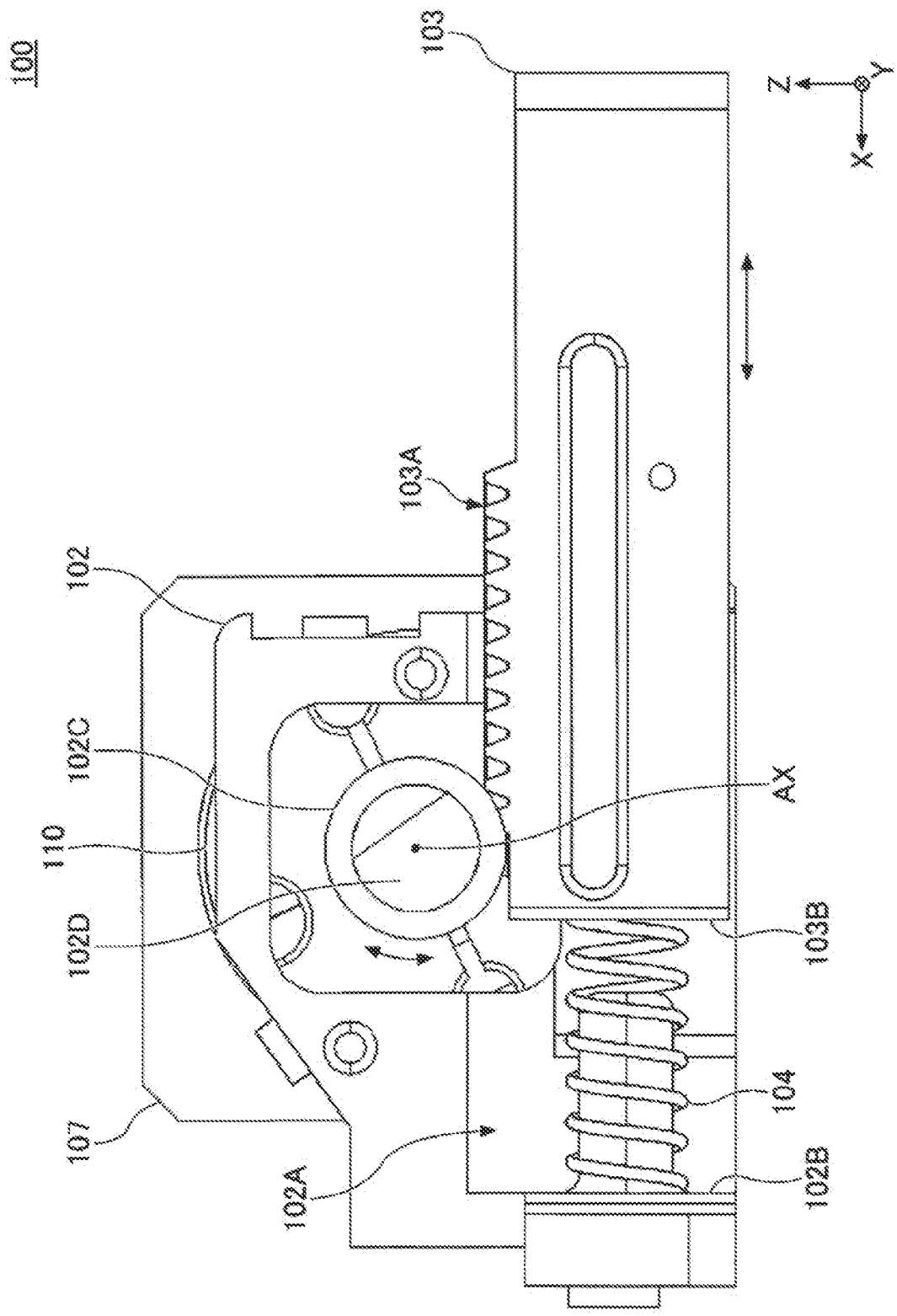
FIG. 4 is a left side view of the operating device.

FIGS. 1 to 3 are perspective views of an operating device 100 in accordance with one embodiment. FIG. 2 illustrates the operating device 100 with a frame 101 removed. FIG. 3 illustrates the bottom, which faces in a negative direction of the Z axis, of the operating device 100 of FIG. 2. FIG. 4 is a left side view of the operating device 100. FIG. 4 illustrates the operating device 100 with the frame 101, a board 105, and a rotation angle sensor 106 removed. In the following description, for convenience of explanation, the term "direction along the X axis" refers to a depth direction of the device in the figures, the term "direction along the Y axis" refers to a side-to-side direction thereof, and the term "direction along the Z axis" refers to a height direction thereof. In addition, the term "positive direction of the X axis" refers to a forward direction, the term "positive direction of the Y axis" refers to a rightward direction, and the term "positive direction of the Z axis" refers to an upward direction.

As illustrated in FIGS. 1 to 4, the operating device 100 includes the frame 101, a gearbox 102, an operating member 103, a helical compression spring 104, the board 105, the rotation angle sensor 106, a brake mechanism 107, and a coupling mechanism 110.

The frame 101 is a part that supports the components. The frame 101 supports, for example, the board 105 and the rotation angle sensor 106, which are arranged on the left of the frame 101 or in a negative direction of the Y axis relative to the frame 101. The frame 101 further supports, for example, the gearbox 102 disposed on the right of the frame 101 or in the positive direction of the Y axis relative to the frame 101.

The gearbox 102 has a space 102A, a front wall 102B, a gear 102C, and a pinion shaft 102D. The space 102A accommodates the gear 102C, the pinion shaft 102D, the operating member 103, and the helical compression spring 104. The gear 102C and the pinion shaft 102D are examples of a rotating member, and are rotatable about the axis AX of rotation (hereinafter, "rotation axis AX") (refer to FIG. 4) parallel to the Y axis in the space 102A. The gear 102C is coaxial with the pinion shaft 102D and is fixed to the pinion shaft 102D. Thus, the gear 102C rotates together with the pinion shaft 102D. The front wall 102B is a wall exposed to the space 102A, and faces a front end face 103B of the operating member 103.

The operating member 103 is slidable in the depth direction, or along the X axis in FIGS. 1 to 4, in the space 102A inside the gearbox 102. The operating member 103 is a part that extends in the depth direction, or along the X axis in FIGS. 1 to 4, and has, but not limited to, a substantially parallelepiped shape. The operating member 103 is movable forward, or in the positive direction of the X axis, in the space 102A inside the gearbox 102 when pushed by an operator. The operating member 103 has, in its upper surface, a rack gear 103A having multiple teeth arranged in the depth direction. The rack gear 103A meshes with the gear 102C disposed in the space 102A inside the gearbox 102. The rack gear 103A and the gear 102C constitute a rack-and-pinion mechanism. Thus, the operating member 103 can rotate the gear 102C via the rack-and-pinion mechanism while moving in the depth direction, or along the X axis in FIGS. 1 to 4.

The helical compression spring 104 is an example of a biasing unit. The helical compression spring 104 is disposed between the front end face 103B of the operating member 103 and the front wall 102B of the gearbox 102, and is elastically deformable in the depth direction, or along the X axis in FIGS. 3 and 4. The helical compression spring 104 biases the operating member 103 backward, or in a negative direction of the X axis in FIGS. 3 and 4. Thus, the operating member 103 can be automatically moved backward when released from being pushed.

The board 105 is a flat part on which various electrical components, such as the rotation angle sensor 106, are mounted. The board 105 is disposed on the rotation axis AX and is fixed on the left of the frame 101 or in the negative direction of the Y axis relative to the frame 101. Examples of the board 105 include a rigid board, such as a printed wiring board (PWB).

The rotation angle sensor 106 is an example of a detecting unit. The rotation angle sensor 106 is disposed on the rotation axis AX and detects an angle of rotation of the gear 102C and the pinion shaft 102D. The rotation angle sensor 106 is mounted on a surface of the board 105 that faces in the negative direction of the Y axis. The rotation angle sensor 106 includes a casing 106a and a rotor 106b. The casing 106a is fixed to the surface of the board 105 facing in the negative direction of the Y axis, and accommodates the rotor 106b. The rotor 106b is rotatable within the casing 106a. The rotor 106b engages with one end of the pinion shaft 102D extending through the board 105. Thus, the rotor 106b rotates together with the gear 102C and the pinion shaft 102D as the operating member 103 is pushed. The rotation angle sensor 106 detects a rotation angle and outputs a rotation-angle detection signal indicating the rotation angle to a controller 120. The rotation angle detected by the rotation angle sensor 106 is proportional to a push amount by which the operating member 103 is pushed. Therefore, the controller 120 can convert the rotation angle detected by the rotation angle sensor 106 into the push amount, by which the operating member 103 is pushed, by using a predetermined conversion equation. The rotation angle sensor 106 can be, for example, a resistive, magnetic, optical, or mechanical sensor. A linear position sensor that directly detects the push amount, by which the operating member 103 is pushed, or the distance of movement of the operating member 103 in the depth direction, may be used instead of the rotation angle sensor 106.

The brake mechanism 107 is an example of a braking unit. The brake mechanism 107 is disposed on the rotation axis AX and is coupled to the pinion shaft 102D via the coupling mechanism 110. The brake mechanism 107 operates in response to a control signal externally supplied, and brakes rotation of the gear 102C and the pinion shaft 102D. In this embodiment, the brake mechanism 107 is an electromagnetic brake.

The coupling mechanism 110 is disposed on the rotation axis AX and is located between the pinion shaft 102D and the brake mechanism 107. The coupling mechanism 110 couples the brake mechanism 107 to the pinion shaft 102D. In the embodiment, the coupling mechanism 110 is a coupling joint.

In FIG. 1, components of the operating device 100 that are electrically connected to the outside, for example, a flexible printed wiring board, are not illustrated. Actually, the operating device 100 at least includes an electrical connection component to supply a control signal from the outside to the brake mechanism 107 and an electrical connection component through which the rotation angle sensor 106 outputs a rotation-angle detection signal to the outside.

Figure 5:
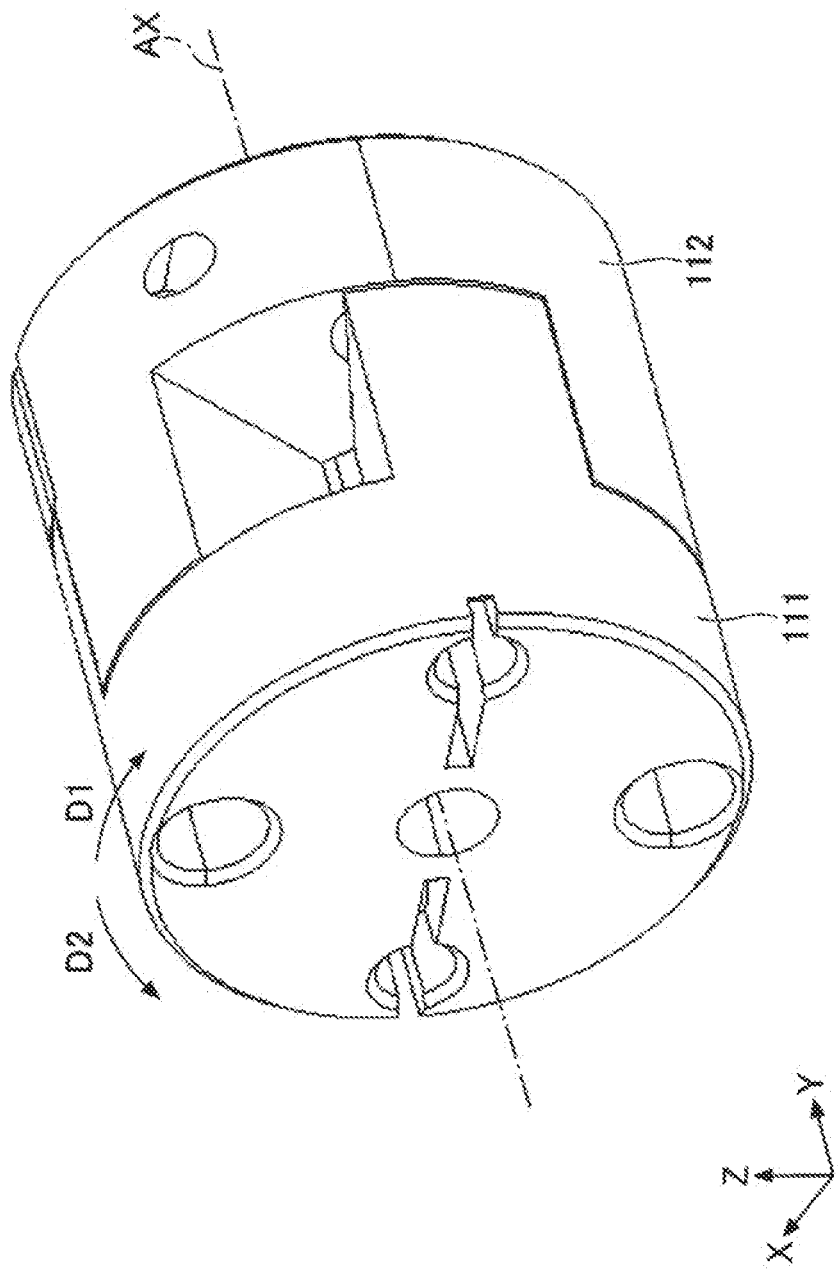
FIG. 5 is a perspective view of a coupling mechanism in accordance with one embodiment.
Figure 6:
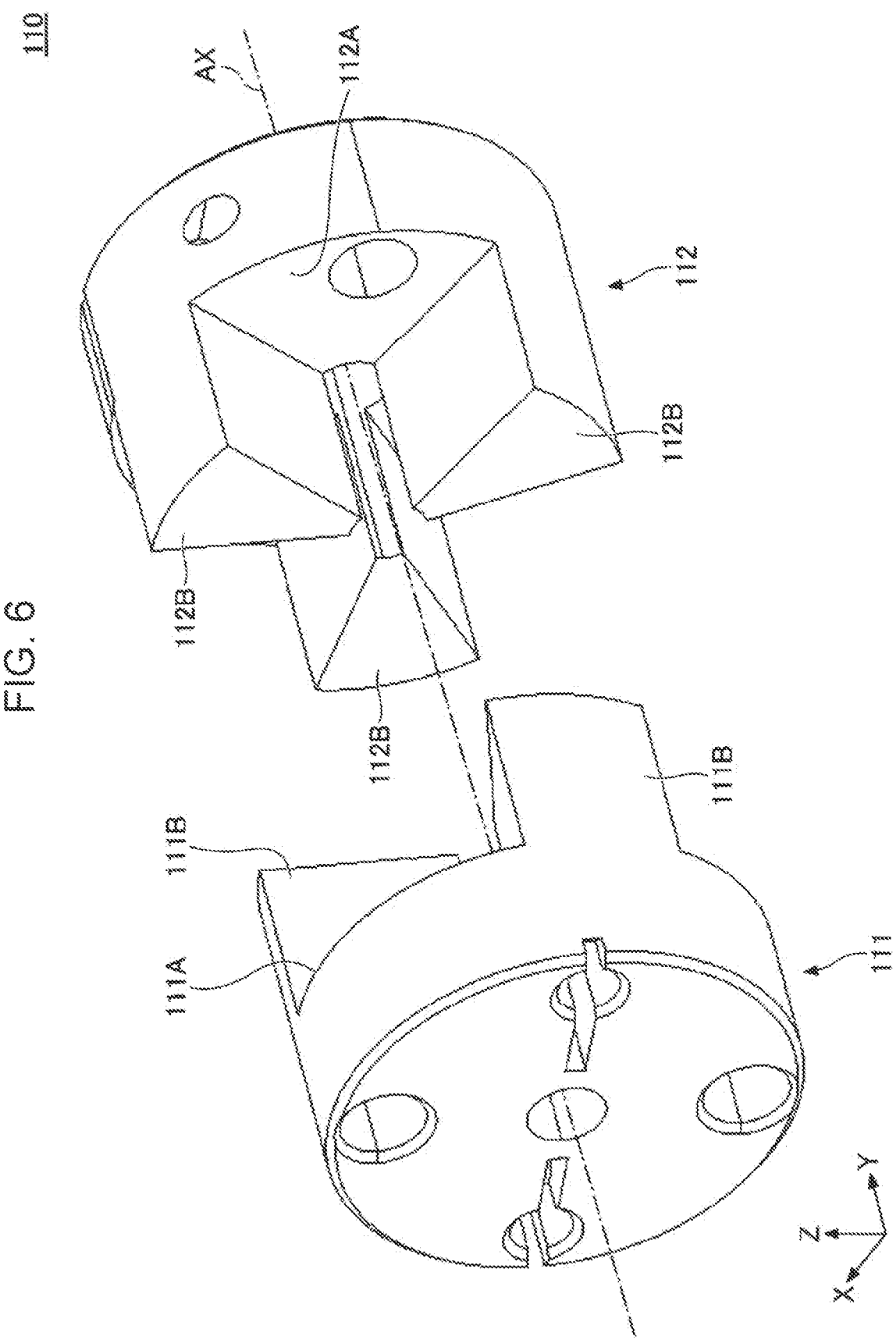
FIG. 6 is an exploded perspective view of the coupling mechanism.
Figure 7:
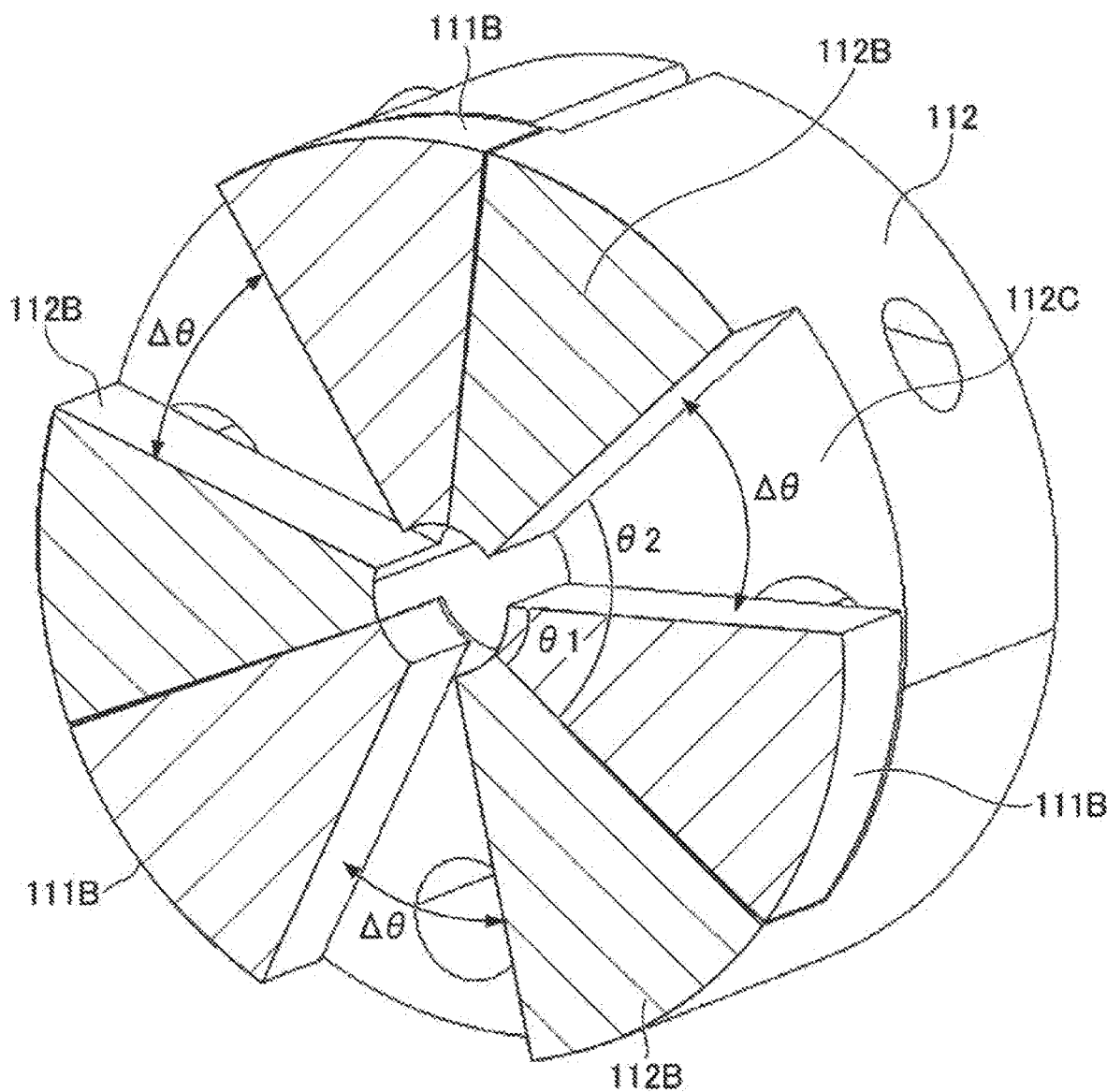
FIG. 7 is a perspective sectional view of the coupling mechanism.

FIG. 5 is a perspective view of the coupling mechanism 110 in accordance with one embodiment. FIG. 6 is an exploded perspective view of the coupling mechanism 110. FIG. 7 is a perspective sectional view of the coupling mechanism 110.

As illustrated in FIGS. 5 to 7, the coupling mechanism 110 includes a first joint 111 and a second joint 112.

The first joint 111 is attached to the other end of the pinion shaft 102D, and rotates together with the pinion shaft 102D. The first joint 111 has a face 111A facing the second joint 112 and includes three pawls 111B protruding from the face 111A toward the second joint 112. The three pawls 111B are spaced 120° apart on a circle having a center coincident with the rotation axis AX. The three pawls 111B each have a sector shape having a predetermined central angle θ1 as viewed in the direction along the rotation axis AX. Each pawl 111B is fitted into a space 112C defined between two adjacent pawls 112B of the second joint 112 when the first joint 111 and the second joint 112 are joined together.

The second joint 112 is attached to one end of a shaft included in the brake mechanism 107, and rotates together with the shaft. The second joint 112 has a face 112A facing the first joint 111 and includes three pawls 112B protruding from the face 112A toward the first joint 111. Like the three pawls 111B, the three pawls 112B are spaced 120° apart on a circle having a center coincident with the rotation axis AX. The three pawls 112B each have a sector shape having the predetermined central angle θ1 as viewed in the direction along the rotation axis AX.

In the coupling mechanism 110 with such a configuration, the three pawls 111B of the first joint 111 engage with the three pawls 112B of the second joint 112 such that the first joint 111 and the second joint 112 rotate together.

Specifically, when the first joint 111 rotates clockwise (D1 direction in FIG. 5) as viewed in the positive direction of the Y axis in response to movement of the operating member 103 in the positive direction of the X axis in which the operating member 103 is pushed, sides of the three pawls 111B that face in a clockwise direction come into contact with sides of the three pawls 112B that are located ahead in the clockwise direction, so that the second joint 112 is rotated clockwise.

In contrast, when the first joint 111 rotates counterclockwise (D2 direction in FIG. 5) as viewed in the positive direction of the Y axis in response to movement of the operating member 103 in the negative direction of the X axis in which the operating member 103 is returned, sides of the three pawls 111B that face in a counterclockwise direction come into contact with sides of the three pawls 112B that are located ahead in the counterclockwise direction, so that the second joint 112 is rotated counterclockwise.

Referring to FIG. 7, each space 112C between the two adjacent pawls 112B defines a sector having a central angle θ2, which is larger than the central angle θ1 of a sector defined by the pawl 111B fitted in the space 112C.

Thus, a clearance Δθ (Δθ=θ2−θ1) is left between the pawls 111B and 112B that are next to each other in a rotation direction. The pawl 111B can move a distance corresponding to the clearance Δθ in the space 112C.

In other words, in the coupling mechanism 110 in the embodiment, if the brake mechanism 107 brakes rotation of the second joint 112, each clearance Δθ left between the pawls 111B and 112B that are next to each other allows the first joint 111 to rotate a distance corresponding to the clearance Δθ.

For example, FIGS. 5 to 7 illustrate the coupling mechanism 110 under conditions where the operating member 103 is pushed. The sides of the three pawls 111B facing in the clockwise direction are in contact with the sides of the three pawls 112B located ahead in the direction of movement of the sides of the pawls 111B. Thus, the clearance Δθ is left between the side of each of the three pawls 111B facing in the counterclockwise direction and the side of each of the three pawls 112B located ahead in the counterclockwise direction. Therefore, the first joint 111 can rotate a distance corresponding to the clearance Δθ in the counterclockwise direction even if the brake mechanism 107 brakes rotation of the second joint 112.

System Configuration of Operation System 10

Figure 8:
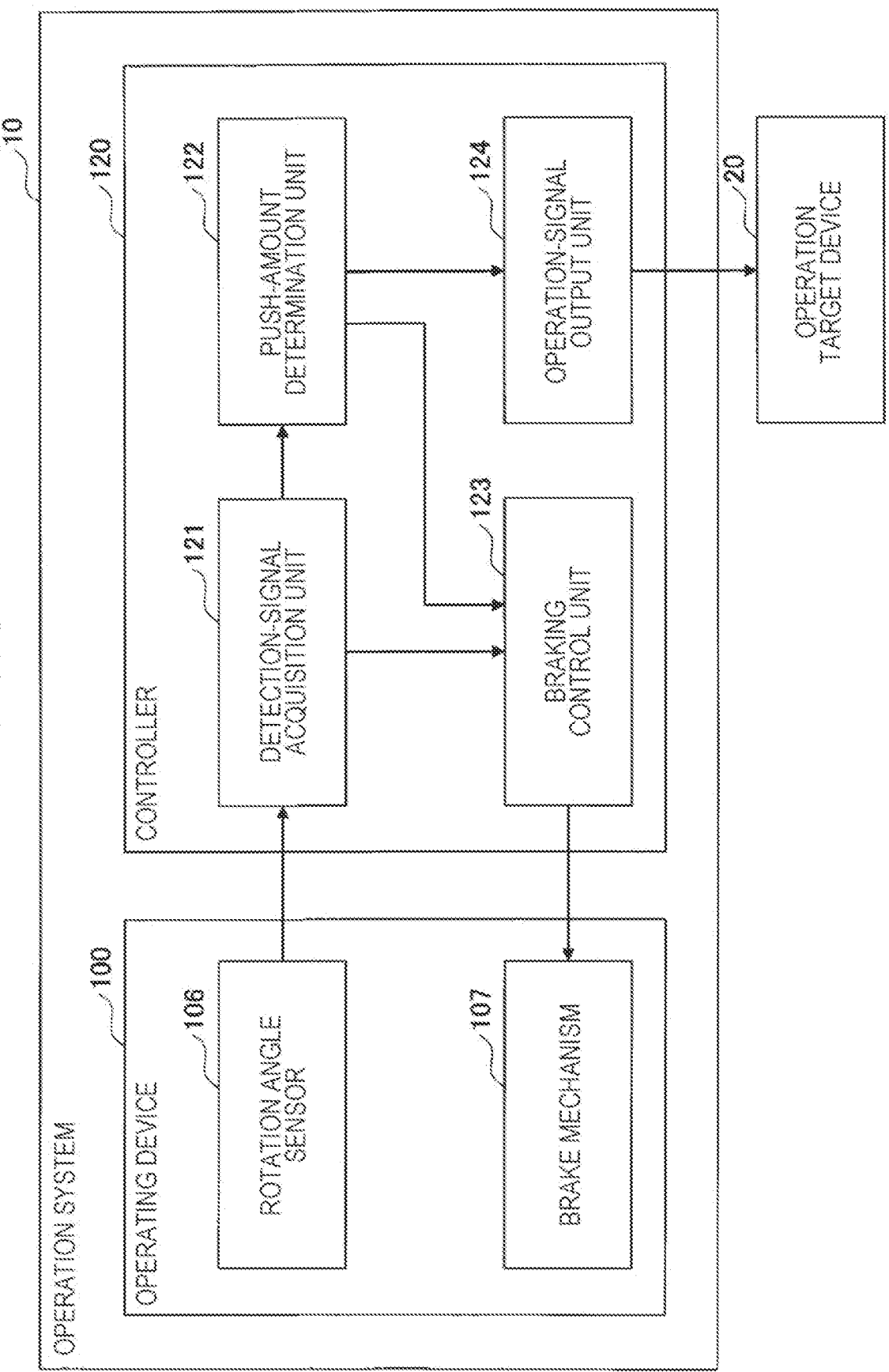
FIG. 8 is a block diagram illustrating an exemplary system configuration of an operation system in accordance with one embodiment.

FIG. 8 is a block diagram illustrating an exemplary system configuration of an operation system 10 in accordance with one embodiment. As illustrated in FIG. 8, the operation system 10 includes the operating device 100 and the controller 120.

The controller 120 is a device that controls a braking operation of the brake mechanism 107 included in the operating device 100. As illustrated in FIG. 8, the controller 120 includes a detection-signal acquisition unit 121, a push-amount determination unit 122, a braking control unit 123, and an operation-signal output unit 124.

The detection-signal acquisition unit 121 acquires a rotation-angle detection signal output from the rotation angle sensor 106 included in the operating device 100.

The push-amount determination unit 122 determines a push amount, by which the operating member 103 is pushed, based on the rotation-angle detection signal acquired by the detection-signal acquisition unit 121. For example, the rotation-angle detection signal output from the rotation angle sensor 106 has a voltage that changes depending on the angle of rotation of the gear 102C and the pinion shaft 102D, or the push amount by which the operating member 103 is pushed. The push-amount determination unit 122 can derive the push amount, by which the operating member 103 is pushed, from a voltage of the rotation-angle detection signal by using a predetermined conversion equation or a predetermined conversion table.

The braking control unit 123 controls the braking operation of the brake mechanism 107 included in the operating device 100 based on the rotation-angle detection signal acquired by the detection-signal acquisition unit 121 and the push amount, by which the operating member 103 is pushed, determined by the push-amount determination unit 122.

For example, when the braking control unit 123 determines, based on the push amount determined by the push-amount determination unit 122, that the operating member 103 is pushed into a predetermined retracted position, the braking control unit 123 causes the brake mechanism 107 to brake rotation of the gear 102C and the pinion shaft 102D, thus causing the brake mechanism 107 to hold the operating member 103 pushed.

For example, when the operator stops the pushing operation while the brake mechanism 107 is holding the operating member 103 pushed, the braking control unit 123 determines, based on the rotation-angle detection signal acquired by the detection-signal acquisition unit 121, that the gear 102C and the pinion shaft 102D are reversed because of the clearances in the coupling mechanism 110, thus causing the brake mechanism 107 to stop holding.

The controller 120 can set the predetermined retracted position for the operating member 103 to any position and store the set position in a memory, for example. Thus, the controller 120 can change the predetermined retracted position depending on the purpose of using the operating member 103 or the usage situation (e.g., the kind of game, a scene, or setting).

The operation-signal output unit 124 outputs an operation signal to an operation target device 20. The operation signal indicates the push amount, by which the operating member 103 is pushed, determined by the push-amount determination unit 122. Examples of the operation target device 20 include a game machine and a vehicle-mounted device, such as a navigation device. The operation target device 20 may be any other device.

The above-described functions of the controller 120 are implemented by, for example, executing programs stored in a memory, such as a read-only memory (ROM) or a random-access memory (RAM), in the controller 120 through a central processing unit (CPU), which is an example of a computer.

The controller 120 may be a device physically located inside the operating device 100, for example, an integrated circuit (IC), or may be a device physically located outside the operating device 100. Furthermore, the controller 120 may be connected to the operating device 100 in a wired manner, such as via a communication cable, or may be connected to the operating device 100 in a wireless manner, such as via Bluetooth (registered trademark), Wi-Fi (registered trademark), or infrared communication.

The controller 120 may be a device physically located inside the operation target device 20, for example, an IC, or may be a device physically located outside the operation target device 20. Furthermore, the controller 120 may be connected to the operation target device 20 in a wired manner, such as via a communication cable, or may be connected to the operation target device 20 in a wireless manner, such as via Bluetooth (registered trademark), Wi-Fi (registered trademark), or infrared communication.

Process by Controller 120

FIG. 9 is a flowchart illustrating a process by the controller 120 in accordance with one embodiment.

The detection-signal acquisition unit 121 acquires a rotation-angle detection signal output from the rotation angle sensor 106 of the operating device 100 (step S901). Then, the push-amount determination unit 122 determines, based on the rotation-angle detection signal acquired in step S901, a push amount by which the operating member 103 is pushed (step S902). The braking control unit 123 determines, based on the push amount determined in step S902, whether the operating member 103 is pushed into the predetermined retracted position (step S903).

If it is determined in step S903 that the operating member 103 is not pushed into the predetermined retracted position (NO in step S903), the controller 120 returns the process to step S901.

If it is determined in step S903 that the operating member 103 is pushed into the predetermined retracted position (YES in step S903), the braking control unit 123 causes the brake mechanism 107 to brake rotation of the gear 102C and the pinion shaft 102D, thus holding the operating member 103 pushed (step S904).

Then, the detection-signal acquisition unit 121 acquires a rotation-angle detection signal output from the rotation angle sensor 106 of the operating device 100 (step S905). The braking control unit 123 determines, based on the rotation-angle detection signal acquired in step S905, whether the operating member 103 is moved a predetermined distance or more in a return direction (step S906).

If it is determined in step S906 that the operating member 103 is not moved the predetermined distance or more in the return direction (NO in step S906), the controller 120 returns the process to step S905.

If it is determined in step S906 that the operating member 103 is moved the predetermined distance or more in the return direction (YES in step S906), the braking control unit 123 causes the brake mechanism 107 to stop braking, thus releasing the operating member 103 from being held pushed (step S907). The controller 120 terminates the process including such a series of steps illustrated in FIG. 9.

Operation of Operating Device 100

FIGS. 10A to 10D are diagrams explaining an operation of the operating device 100 in accordance with one embodiment. FIG. 10A illustrates the operating device 100 in which the operating member 103 is not pushed. FIG. 10B illustrates the operating device 100 in which the operating member 103 is pushed into the predetermined retracted position. FIG. 10C illustrates the operating device 100 in which the operating member 103 is released from being pushed by the operator. FIG. 10D illustrates the operating device 100 in which the operating member 103 is returned to its initial position.

Referring to FIG. 10A, as the operating member 103 is pushed forward (X1 direction in FIG. 10A) by the operator, the gear 102C and the pinion shaft 102D rotate clockwise (D1 direction in FIG. 10A) as viewed in the positive direction of the Y axis.

Referring to FIG. 10B, when the operating member 103 is pushed into the predetermined retracted position by the operator, the controller 120 determines, based on a rotation-angle detection signal from the rotation angle sensor 106, that the operating member 103 is pushed into the predetermined retracted position, and controls the brake mechanism 107 to perform the braking operation. Thus, the brake mechanism 107 performs the braking operation to brake rotation of the gear 102C and the pinion shaft 102D. As a result, the operating member 103 is held at the predetermined retracted position.

When the operator stops pushing the operating member 103 during the braking operation of the brake mechanism 107, the gear 102C can be slightly reversed or rotated counterclockwise (D2 direction in FIG. 10C) as viewed in the positive direction of the Y axis by a distance corresponding to the clearance Δθ, provided in the coupling mechanism 110, due to a biasing force from the helical compression spring 104 as illustrated in FIG. 10C. Thus, the operating member 103 can be slightly moved the distance corresponding to the clearance Δθ backward (X2 direction in FIG. 10C) as illustrated in FIG. 10C. When the controller 120 determines, based on a rotation-angle detection signal from the rotation angle sensor 106, that the operating member 103 is slightly moved backward, the controller 120 causes the brake mechanism 107 to stop braking the gear 102C and the pinion shaft 102D. Thus, the operating member 103 is released from being held at the predetermined retracted position, and can be returned to its initial position by a biasing force from the helical compression spring 104 as illustrated in FIG. 10D.

Exemplary Control by Controller 120

Figure 11:
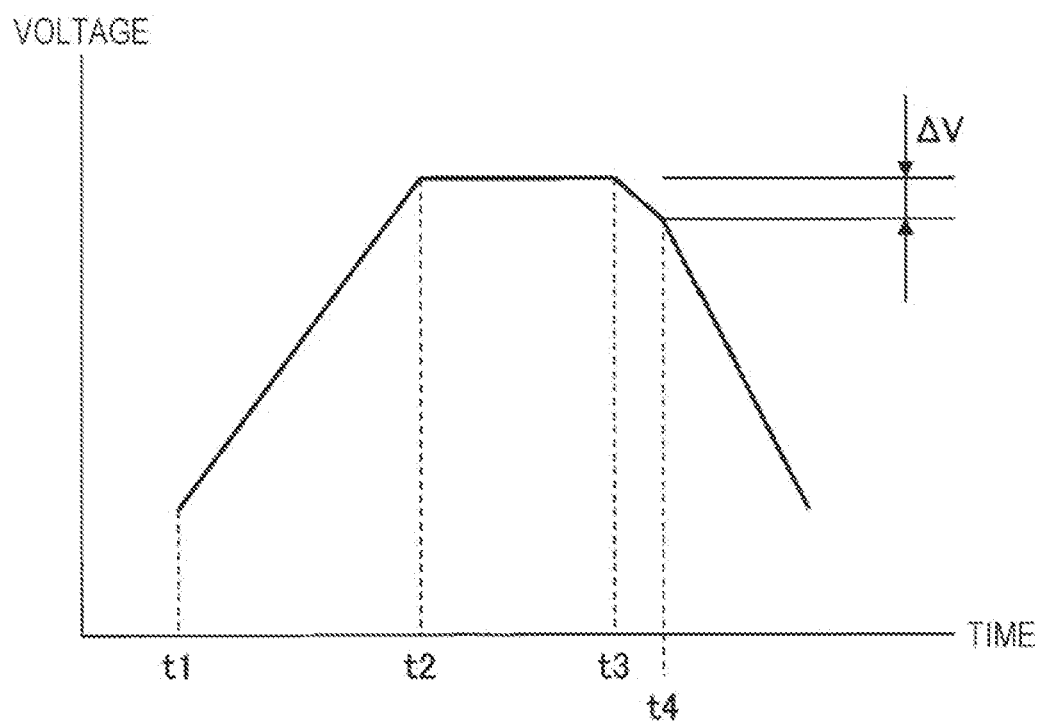
FIG. 11 is a graph illustrating exemplary control by the controller in accordance with one embodiment.

FIG. 11 is a graph illustrating exemplary control by the controller 120 in accordance with one embodiment. In the graph of FIG. 11, the vertical axis represents the voltage of the rotation-angle detection signal, and the horizontal axis represents time.

Referring to FIG. 11, as the amount by which the operating member 103 is pushed gradually increases, the voltage of the rotation-angle detection signal gradually increases during the period from the time (t1) when the operator starts pushing the operating member 103 to the time (t2) when the pushed operating member 103 reaches the predetermined retracted position.

When the pushed operating member 103 reaches the predetermined retracted position (time t2), the braking control unit 123 controls the brake mechanism 107 to perform the braking operation, so that the operating member 103 is held at the predetermined retracted position. This prevents the operator from further pushing the operating member 103. Therefore, the voltage of the rotation-angle detection signal is constant until the operating member 103 is released from being pushed (during the period from time t2 to time t3).

When the operator stops pushing the operating member 103 (time t3), the operating member 103 is slightly moved a distance corresponding to the clearance Δθ, provided in the coupling mechanism 110, in the return direction by a biasing force from the helical compression spring 104. This results in a slight reduction in voltage of the rotation-angle detection signal.

When a reduction in voltage of the rotation-angle detection signal reaches a predetermined threshold ΔV (time t4), the controller 120 controls the brake mechanism 107 to stop the braking operation of the brake mechanism 107. Thus, the operating member 103 is released from being held at the predetermined retracted position, and is returned to its initial position by a biasing force from the helical compression spring 104.

As described above, the controller 120 in the embodiment allows the brake mechanism 107 to hold the operating member 103 pushed in response to determining, based on the rotation-angle detection signal from the rotation angle sensor 106, that the operating member 103 is pushed into the predetermined retracted position. The controller 120 allows the brake mechanism 107 to stop holding the operating member 103 in response to determining, based on the rotation-angle detection signal, that the operating member 103 is moved in the return direction because of the clearance Δθ in the coupling mechanism 110, which is included in a drive transmission system between the operating member 103 and the brake mechanism 107. Therefore, the controller 120 can detect a stoppage of the pushing operation of the operator without any optional contact sensor and release the operating member 103 from being held by the brake mechanism 107.

Other Embodiments

Figure 12:
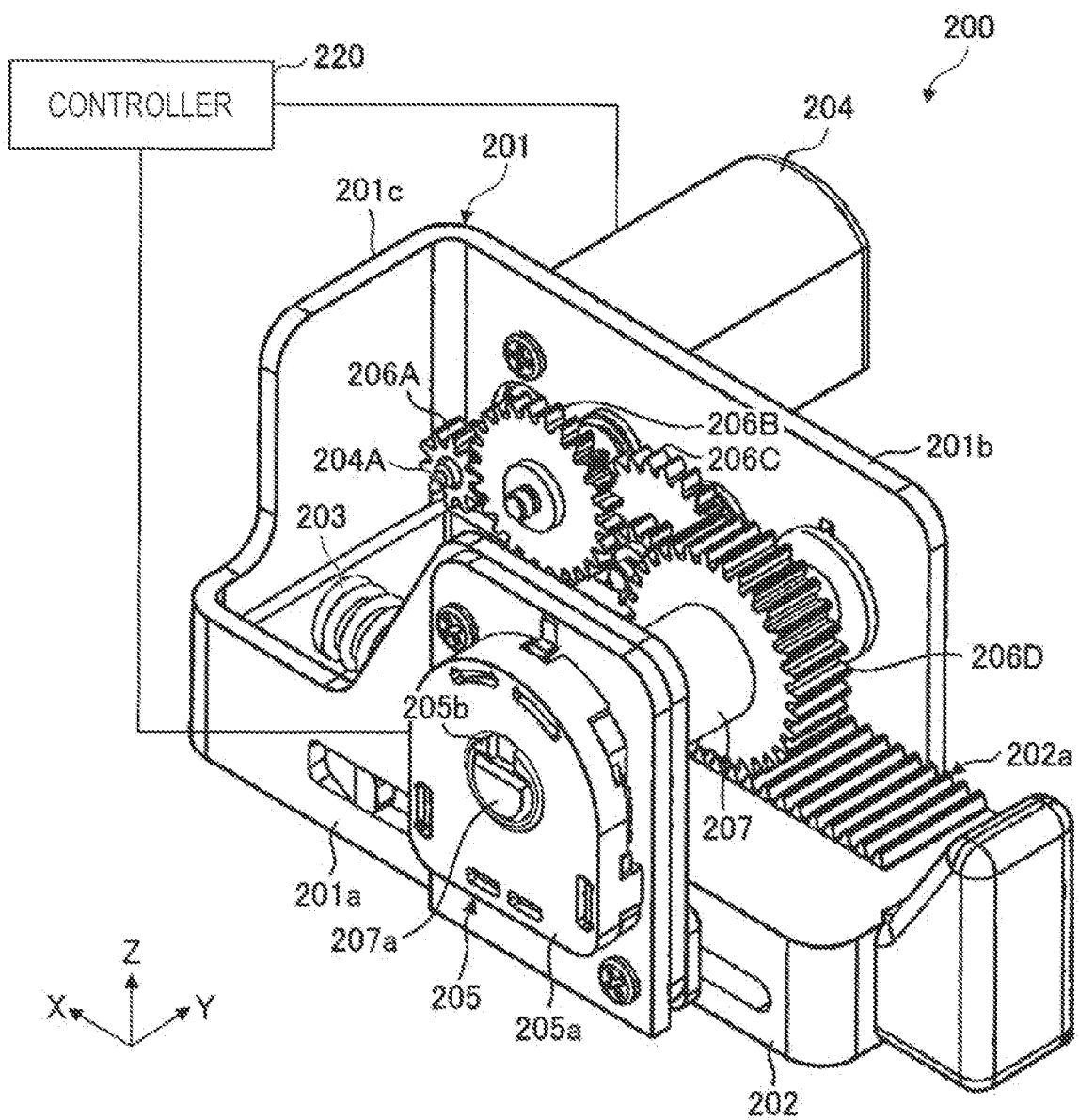
FIG. 12 is a perspective view illustrating an exemplary configuration of an operating device in accordance with another embodiment.

FIG. 12 is a perspective view of an exemplary configuration of an operating device 200 in accordance with another embodiment. As illustrated in FIG. 12, the operating device 200 includes a frame 201, an operating member 202, a helical compression spring 203, a motor 204, a rotation angle sensor 205, gears 206A to 206D, and a pinion shaft 207.

The frame 201 is a part that accommodates and supports the components. The frame 201 includes a left wall 201a, a right wall 201b, and a front wall 201c, and is formed by bending a metal sheet, for example.

The operating member 202 is slidable in the depth direction (along the X axis in FIG. 12) relative to the frame 201. The operating member 202 is capable of being pushed by the operator, and can be moved forward (i.e., in the positive direction of the X axis in FIG. 12) from a protruding position, at which the operating member 202 protrudes from the frame 201 backward (i.e., in the negative direction of the X axis in FIG. 12), to a retracted position at which the operating member 202 is pushed into the frame 201. The operating member 202 has, in its upper surface, a rack gear 202a including multiple teeth arranged in the depth direction. The rack gear 202a, which meshes with the gear 206D, and the gear 206D constitute a rack-and-pinion mechanism. Thus, the operating member 202 can rotate the gear 206D via the rack-and-pinion mechanism while moving in the depth direction, or along the X axis in FIG. 12.

The helical compression spring 203 is disposed between the front wall 201c of the frame 201 and a front end face of the operating member 202, and is elastically deformable in the depth direction, or along the X axis in FIG. 12. The helical compression spring 203 biases the operating member 202 backward, or in the negative direction of the X axis in FIG. 12. Thus, the operating member 202 can be automatically moved backward or returned when released from being pushed.

The motor 204 is an example of the braking unit. The motor 204 has a rotating shaft 204A, which extends through the right wall 201b of the frame 201 and is fixed to an outer surface of the right wall 201b so as to reach the interior of the frame 201. The rotating shaft 204A has an end to which the gear 206A is attached. The rotating shaft 204A of the motor 204 is rotated in response to a control signal from a controller 220, so that the operating member 202 can be moved in the depth direction, or along the X axis in FIG. 12, through the multiple gears 206A to 206D. For example, when the operating member 202 is pushed into a predetermined retracted position, the motor 204 brakes rotation of the gear 206A to stop movement of the operating member 202, thus holding the operating member 202 pushed into the predetermined retracted position. Examples of the motor 204 include a direct-current (DC) motor and a stepping motor.

The rotation angle sensor 205 is an example of the detecting unit. The rotation angle sensor 205 is disposed on an outer surface of the left wall 201a of the frame 201 and is coaxial with the gear 206D and the pinion shaft 207. The rotation angle sensor 205 detects an angle of rotation of the gear 206D and the pinion shaft 207. The rotation angle sensor 205 includes a casing 205a and a rotor 205b. The rotor 205b is rotatable relative to the casing 205a. The rotor 205b engages with an end portion 207a of the pinion shaft 207 extending through the left wall 201a. Thus, the rotor 205b rotates together with the gear 206D and the pinion shaft 207 as the operating member 202 is pushed. The rotation angle sensor 205 detects a rotation angle and outputs a rotation-angle detection signal indicating the rotation angle to the controller 220. The rotation angle detected by the rotation angle sensor 205 is proportional to a push amount by which the operating member 202 is pushed. Therefore, the controller 220 can convert the rotation angle detected by the rotation angle sensor 205 into the push amount, by which the operating member 202 is pushed, by using a predetermined conversion equation. The rotation angle sensor 205 can be, for example, a resistive, magnetic, optical, or mechanical sensor. A linear position sensor that directly detects the push amount by which the operating member 202 is pushed, or the distance of movement of the operating member 202 in the depth direction, may be used instead of the rotation angle sensor 205.

The controller 220 has the same configuration as that of the controller 120, and a detailed description of the controller 220 is omitted.

In the operating device 200 with such a configuration, when the operating member 202 is pushed into the predetermined retracted position, the motor 204 brakes rotation of the gear 206A to stop movement of the operating member 202, thus holding the operating member 202 pushed into the predetermined retracted position. For the multiple gears (i.e., the gears 206A to 206D and the rack gear 202a), the gears engaging with each other have a backlash therebetween. In the operating device 200, therefore, the operating member 202 can be slightly moved backward (i.e., in the negative direction of the X axis in FIG. 12) by the sum of backlashes due to a biasing force from the helical compression spring 203 when the operator stops pushing the operating member 202, which is held at the predetermined retracted position. The controller 220 causes the motor 204 to stop braking the gear 206A in response to determining, based on a rotation-angle detection signal output from the rotation angle sensor 205, that the operating member 202 is slightly moved backward. Thus, the operating member 202 is released from being held at the predetermined retracted position, and can be returned to its initial position by a biasing force from the helical compression spring 203.

As described above, the controller 220 in this embodiment allows the motor 204 to hold the operating member 202 pushed in response to determining, based on the rotation-angle detection signal from the rotation angle sensor 205, that the operating member 202 is pushed into the predetermined retracted position. In addition, the controller 220 allows the motor 204 to stop holding the operating member 202 in response to determining, based on the rotation-angle detection signal, that the operating member 202 is moved in the return direction because of the backlashes in a drive transmission system between the operating member 202 and the motor 204. Therefore, the controller 220 can detect a stoppage of the pushing operation of the operator without any optional contact sensor and release the operating member 202 from being held by the motor 204.

Although the embodiments of the present invention have been described in detail above, the present invention is not limited to these embodiments and can be variously modified or changed within the spirit and scope of the present invention described in the appended claims.

What is claimed is:

1. A controller that controls an operating device, the operating device including an operating member capable of being pushed by an operator, biasing means for biasing the operating member in a return direction, detecting means configured to detect a distance of movement of the operating member and output a detection signal indicating the distance of movement, and braking means configured to brake movement of the operating member, wherein in response to determining, based on the detection signal, that the operating member is pushed into a predetermined retracted position, the controller causes the braking means to hold the operating member pushed, and wherein in response to determining, based on the detection signal, that the operating member is moved in the return direction because of a clearance in a drive transmission system between the operating member and the braking means, the controller causes the braking means to stop holding the operating member.

2. The controller according to claim 1, wherein the drive transmission system includes a coupling joint including a first joint that rotates as the operating member is moved and a second joint that rotates together with a rotating shaft of the braking means, and the first joint and the second joint engage with each other to rotate together, and wherein the controller causes the braking means to stop holding the operating member in response to determining, based on the detection signal, that the operating member is moved in the return direction because of a clearance in a rotation direction between the first and second joints.

3. The controller according to claim 1, wherein the drive transmission system includes at least two gears meshing with each other, and wherein the controller causes the braking means to stop holding the operating member in response to determining, based on the detection signal, that the operating member is moved in the return direction because of a backlash between the at least two gears.

4. The controller according to claim 1, wherein the operating device further includes a rotating member that rotates as the operating member is pushed, and wherein the detecting means is a rotation angle sensor configured to detect an angle of rotation of the rotating member that depends on the distance of movement of the operating member.

5. The controller according to claim 4, wherein as the operating member is pushed, the rotating member is rotated through a rack-and-pinion mechanism disposed between the operating member and the rotating member.

6. The controller according to claim 1, wherein the detecting means is a linear position sensor configured to detect the distance of movement of the operating member.

7. The controller according to claim 1, wherein the predetermined retracted position is settable to any position.

8. An operation system comprising:

the controller according to claim 1; and the operating device.

* * * * *